(12) United States Patent
Bejjam et al.

(10) Patent No.: US 12,664,451 B2
(45) Date of Patent: Jun. 23, 2026

(54) SYSTEM AND METHOD FOR GENERATING A PREDICTIVE MODEL BASED ON AUTOMATED DATA MODELLING

(71) Applicant: HCL Technologies Limited, Uttar Pradesh (IN)

(72) Inventors: Deepthi Priya Bejjam, Hyderabad (IN); S U M Prasad Dhanyamraju, Hyderabad (IN); Sriganesh Sultanpurkar, Hyderabad (IN); Vamsi Peddireddy, Hyderabad (IN)

(73) Assignee: HCL Technologies Limited, Uttar Pradesh (IN)

( * ) Notice: Subject to any disclaimer, the term of this patent is extended or adjusted under 35 U.S.C. 154(b) by 448 days.

(21) Appl. No.: 16/810,275

(22) Filed: Mar. 5, 2020

(65) Prior Publication Data

US 2020/0285984 A1      Sep. 10, 2020

(30) Foreign Application Priority Data

Mar. 6, 2019    (IN) .............................. 201911008643

(51) Int. Cl.
| | |
|---|---|
| *G06N 7/01* | (2023.01) |
| *G06N 5/04* | (2023.01) |
| *G06N 20/00* | (2019.01) |

(52) U.S. Cl.
CPC ................. *G06N 7/01* (2023.01); *G06N 5/04* (2013.01); *G06N 20/00* (2019.01)

(58) Field of Classification Search
CPC .......... G06N 7/005; G06N 20/00; G06N 5/04;

G06N 7/00; G06N 3/08; G06N 3/0895; G06N 3/09; G06N 3/091; G06N 3/092; G06N 3/094; G06N 3/098; G06N 3/0985; G06N 7/01; G06N 3/096

See application file for complete search history.

(56) References Cited

U.S. PATENT DOCUMENTS

| | | | |
|---|---|---|---|
| 6,330,563 B1 | 12/2001 | Heckerman et al. | |
| 7,480,640 B1 * | 1/2009 | Elad ...................... | G06Q 10/10 |
| | | | 706/14 |

(Continued)

OTHER PUBLICATIONS

Yang et al., "A Comparative Study on Feature Selection in Text Categorization," (1997) (Year: 1997).*

(Continued)

*Primary Examiner* — Kakali Chaki
*Assistant Examiner* — Kevin L. Smith
(74) *Attorney, Agent, or Firm* — Kendal M. Sheets

(57) ABSTRACT

The present disclosure relates to a system(s) and method(s) for generating a predictive model, the method comprises receiving data and extracting one or more predicator features from the data based on a feature selection methodology. In one example, the feature selection methodology comprises computing a degree connectedness for each of the plurality of features using a modified mutual information technique and a Pearson co-efficient and identifying the one or more predicator features on a comparison of degree of connectedness and a predefined threshold. Further, the method comprises identifying a data type associated with the data, and generating a predictive model to be applied on the data based on the data type and the one or more predicator features.

6 Claims, 3 Drawing Sheets

(56) References Cited

U.S. PATENT DOCUMENTS

| | | | | |
|---|---|---|---|---|
| 2003/0088565 | A1* | 5/2003 | Walter | G06F 18/231 |
| 2005/0234763 | A1* | 10/2005 | Pinto | G06Q 10/04 |
| | | | | 706/21 |
| 2006/0116920 | A1* | 6/2006 | Shan | G06Q 30/0202 |
| | | | | 705/7.31 |
| 2006/0161403 | A1* | 7/2006 | Jiang | G06N 20/00 |
| | | | | 703/2 |
| 2007/0239753 | A1* | 10/2007 | Leonard | G06Q 30/02 |
| 2008/0077544 | A1* | 3/2008 | Sureka | G06K 9/6253 |
| | | | | 706/13 |
| 2008/0279434 | A1 | 11/2008 | Cassill | |
| 2011/0238613 | A1* | 9/2011 | Shehory | G06N 7/005 |
| | | | | 706/46 |
| 2015/0170049 | A1* | 6/2015 | Mann | G06N 5/04 |
| | | | | 706/12 |
| 2018/0018590 | A1* | 1/2018 | Szeto | G06N 20/10 |
| 2018/0075175 | A1 | 3/2018 | Chang et al. | |
| 2018/0300737 | A1* | 10/2018 | Bledsoe | G06F 16/2477 |
| 2018/0314938 | A1 | 11/2018 | Andoni et al. | |
| 2018/0357799 | A1* | 12/2018 | Sexton | G06F 18/232 |
| 2019/0042344 | A1* | 2/2019 | Zhao | G06F 17/15 |
| 2019/0080240 | A1* | 3/2019 | Andoni | G06N 3/084 |
| 2019/0156243 | A1* | 5/2019 | Li | G06N 20/00 |

OTHER PUBLICATIONS

SPSS Tutorials: Peason Correlation (WayBack Machine Jan. 25, 2019) (Year: 2019).*
Gunu et al., "Modern Predictive Models for Modeling the College Graduation Rates," IEEE (2017) (Year: 2017).*
Ho et al., "A MapReduce Programming Framework Using Message Passing," IEEE (2010) (Year: 2010).*
Benton et al., "Social Network Analysis: A tool for the identification of next generation trainers," Science Direct (2014) (Year: 2014).*
Hartman et al., "Nonlinearity in stock networks," arXiv (2018) (Year: 2018).*
Dorre et al., "Modeling and Optimizing MapReduce Programs," University of Passau (2013) (Year: 2013).*
Chueng et al., "Lag Order and Critical Values of the Augmented Dickey-Fuller Test," American Statistical Ass'n (1995) (Year: 1995).*
Zhang et al., "Complexity Feature Extraction of Radar Emitter Signals," APCEE (2003) (Year: 2003).*

* cited by examiner

SYSTEM AND METHOD FOR GENERATING A PREDICTIVE MODEL BASED ON AUTOMATED DATA MODELLING

CROSS-REFERENCE TO RELATED APPLICATIONS

The present application claims benefit from Indian Complete Patent Application No. 201911008643 filed on 6 Mar. 2019, the entirety of which is hereby incorporated by reference.

TECHNICAL FIELD

The present disclosure in general relates to the field of predictive modeling. More particularly, the present subject matter relates to a system and a method for generating a predictive model.

BACKGROUND

Nowadays, data is an integral part of any information which is produced from any product, service, device, application etc. Further, the data generated is typically analyzed to obtain intelligence. Generally, the volume of data huge also comprises noise and hence presents a large challenge in understanding and processing.

In general methodology today, there are a series of steps a Data Scientist/Analyst/Engineer performs and they are most time consuming and often prone to errors. Also each data analysis requires a careful understanding and a pool of Data Scientists/Analysts to achieve this. Data analyst/scientist spends most of time on analyzing the data, choosing appropriate features to build most accurate predictive model and choosing/applying correct predictive model from available numerous analytical models for the given dataset/problem statement.

SUMMARY

Before the present system and a method for generating a predictive model are described, it is to be understood that this application is not limited to a particular system, systems, and methodologies described, as there can be multiple possible embodiments, which are not expressly illustrated in the present disclosures. It is also to be understood that the terminology used in the description is for the purpose of describing the particular implementations, versions, or embodiments only, and is not intended to limit the scope of the present application. This summary is provided to introduce aspects related to a system and a method for generating a predictive model. This summary is not intended to identify essential features of the claimed subject matter nor is it intended for use in determining or limiting the scope of the claimed subject matter.

In one embodiment, a method for generating a predictive model is disclosed. In the embodiment, the method comprises receiving data, and extracting one or more predicator features from the data based on a feature selection methodology. In one example, the data comprises a plurality of features indicative of columns in the data. Further, the feature selection methodology comprises computing a degree connectedness for each of the plurality of features using a modified mutual information technique and a Pearson co-efficient and identifying the one or more predicator features on a comparison of degree of connectedness and a predefined threshold. In one example, the degree connectedness is indicative of a connection between one or more features from the plurality of features. The method further comprises identifying a data type associated with the data, generating a predictive model to be applied on the data based on the data type of the one or more predicator features, wherein predictive model comprises a classification model, a time series model and a regression model type. In one example, the data type is one of a time-series data type, a non-time series data type, a numerical data type, a categorical data type, seasonal stationary data type, a stationary data type or trend stationary, In one more example, the stationary or the trend stationary data type is identified using a Augmented Dickey-Fuller test, the time series or the non-time series data type is identified using alternate hypothesis method, and the seasonal stationary data type is identified using a similarly Hurst Exponent Measure.

In one embodiment, a system for generating a predictive model may be disclosed. The system comprises a memory and a processor coupled to the memory, further the processor may be configured to execute programmed instructions stored in the memory. In the embodiment, the system may receive data, clean the data and extract one or more predicator features from the data based on a feature selection methodology. In one example, the data comprises a plurality of features, indicative of columns in the data. The feature selection methodology comprises computing a degree connectedness for each of the plurality of features using a modified mutual information technique and a Pearson co-efficient, and identifying the one or more predicator features on a comparison of degree of connectedness and a predefined threshold. In one example, the degree connectedness may be indicative of a connection between or more features from the plurality of features. The system further comprises identifying a data type associated with the data, generating a predictive model to be applied on the data based on the data type of the one or more predicator features. In one example, the data type may be one of a time-series data type, a non-time series data type, a numerical data type, a categorical data type, seasonal stationary data type, a stationary data type or trend stationary. In one other example, the stationary or the trend stationary data type may be identified using a Augmented Dickey-Fuller test, the time series or the non-time series data type may be identified using alternate hypothesis method, and the seasonal stationary data type may be identified using a similarly Hurst Exponent Measure. Further, the predictive model may comprise a classification model, a time series model and a regression model type.

BRIEF DESCRIPTION OF DRAWINGS

The foregoing detailed description of embodiments is better understood when read in conjunction with the appended drawings. For the purpose of illustrating the present subject matter, an example of construction of the present subject matter is provided as figures; however, the present subject matter is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and method for generating a predictive model, similar or equivalent to those described herein can be used in the practice or testing of embodiments of the present disclosure, the exemplary, system and method for generating a predictive model are now described.

Various modifications to the embodiment will be readily apparent to those skilled in the art and the generic principles herein may be applied to other embodiments for generating a predictive model. However, one of ordinary skill in the art will readily recognize that the present disclosure for generating a predictive model is not intended to be limited to the embodiments described, but is to be accorded the widest scope consistent with the principles and features described herein.

In one embodiment, to solve the problems in the conventional art, a system and method for generating predictive module automatically based on distributed framework. The system and method for generating predictive module which gives a high-performance predictive model as output given the raw data as input.

In one embodiment, the present subject matter, De-Noises the data, preprocess the data for any missing values, constant data, identifies if the data is Time-series or Non-Time series and apply data specific operations. In one example, for time series data find the Stationarity, Seasonality and trends of the data, and for Non-Time Series data, if it Classification or Regression is to be applied and perform the necessary transformations. In the embodiment, features are grouped using various techniques to reduce the number of features to a relatively smaller set for best analysis of Data and results.

Exemplary embodiments for a vehicle body side structure discussed above may provide certain advantages. Further, in the subsequent description, embodiments of the present subject along with the advantages are explained in detail with reference to the FIG. 1 to FIG. 3.

Figure 1:
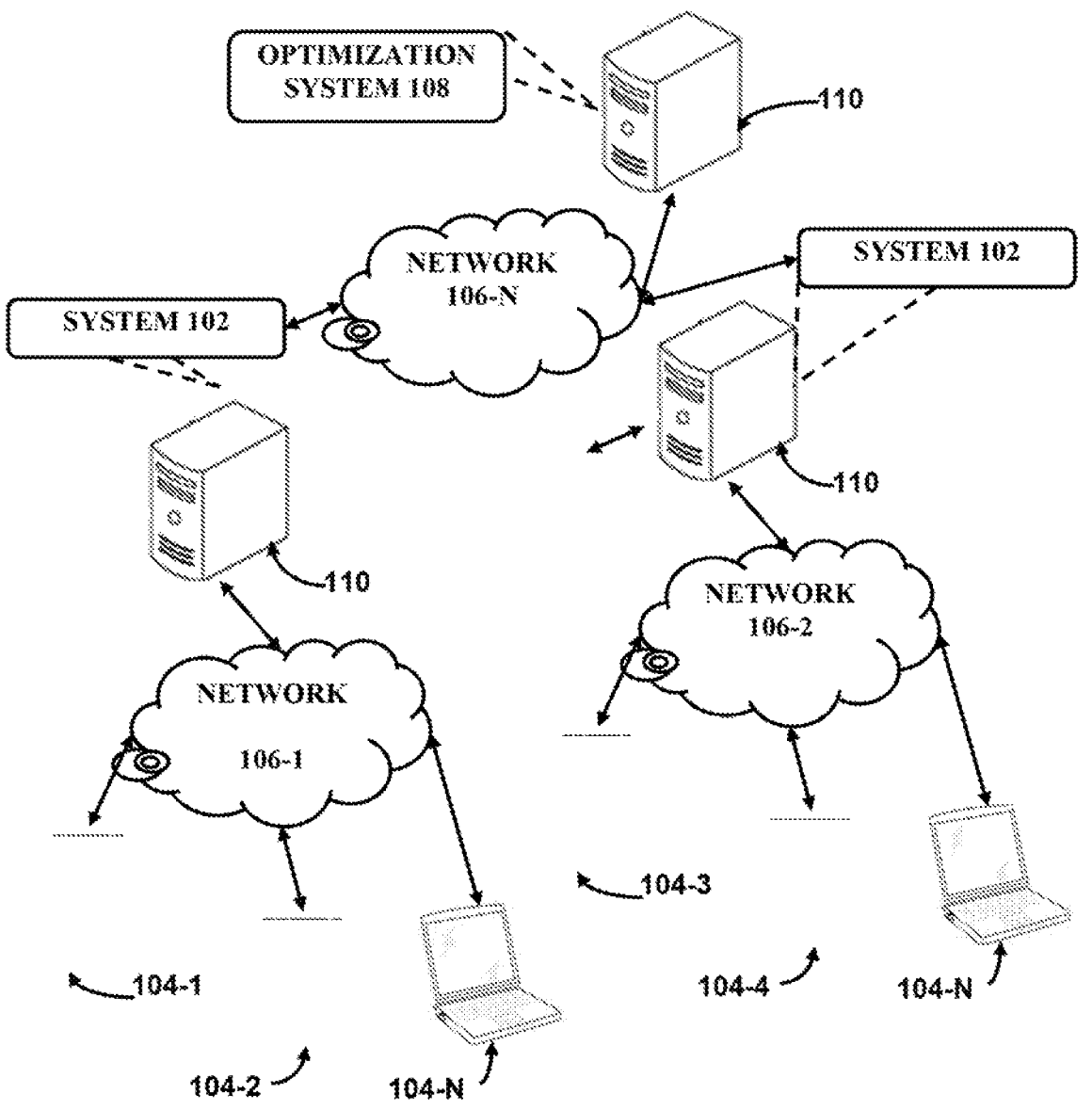
FIG. 1 illustrates a network implementation of a system for generating a predictive model, in accordance with an embodiment of the present subject matter.

Referring now to FIG. 1, embodiment of a network implementation 100 of a system 102-1 . . . 102-N for generating a predictive model is disclosed. Although the present subject matter is explained considering that the system 102 is implemented on a server 110, it may be understood that the system 102 may also be implemented in a variety of computing systems, such as a laptop computer, a desktop computer, a notebook, a workstation, a mainframe computer, a server, a network server, a device 104 and the like. In one implementation, the system 102 may be implemented in a cloud-based environment. It will be understood that multiple users may access the system 102 through one or more user device or applications residing on the user device 104-1 . . . 104-N. Examples of the user device may include, but are not limited to, a portable computer, a personal digital assistant, a handheld system, and a workstation. The system 102 may be communicatively coupled to server 110 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may be either a dedicated network or a shared network. The shared network represents an association of the different types of networks that use a variety of protocols, for example, Hypertext Transfer Protocol (HTTP), Hypertext Transfer Protocol Secure (HTTPS), Secure File Transfer Protocol (SFTP), Transmission Control Protocol/Internet Protocol (TCP/IP), Wireless Application Protocol (WAP), and the like, to communicate with one another.

In the embodiment, the system 102, generating a predictive model may be disclosed. In the embodiment, the system 102 may receive data, and extract one or more predicator features from the data based on a feature selection methodology. In one example, the data comprises a plurality of features, indicative of columns in the data. The feature selection methodology comprises computing a degree connectedness for each of the plurality of features using a modified mutual information technique and a Pearson coefficient, and identifying the one or more predicator features on a comparison of degree of connectedness and a predefined threshold. In one example, the degree connectedness may be indicative of a connection between or more features from the plurality of features. The system 102 further comprises identifying a data type associated with the data, generating a predictive model to be applied on the data based on the data type and the one or more predicator features. In one example, the data type may be one of a time-series data type, a non-time series data type, a numerical data type, a categorical data type, seasonal stationary data type, a stationary data type or trend stationary. In one other example, the stationary or the trend stationary data type may be identified using a Augmented Dickey-Fuller test, the time series or the non-time series data type may be identified using alternate hypothesis method, and the seasonal stationary data type may be identified using a similarly Hurst Exponent Measure. Further, the predictive model may comprise a classification model, a time series model and a regression model type.

In one implementation, the present subject matter may be implemented in a federated distributed environment. The implementation each of the devices 104 may generate a local model alternatively each of the system 102 may generate a local model. Upon generation, an optimization system 108 may obtain the models from the device 104 or system 102. Upon obtaining, tuning parameters such as number of trees, depth of trees are modified. Further to modification, the optimization system 108 may utilize a genetic algorithm to optimize the model.

Figure 2:
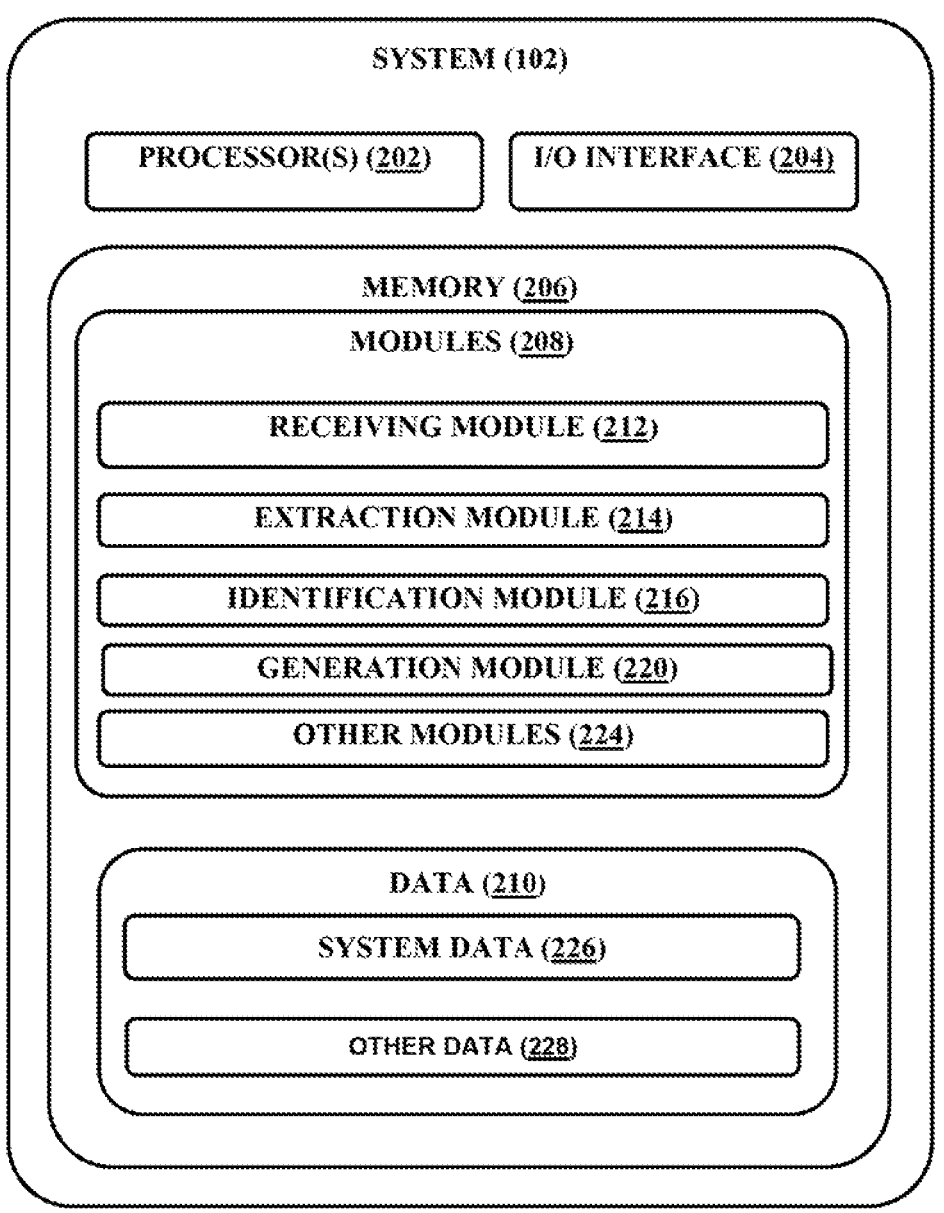
FIG. 2 illustrates and embodiment of the system for generating a predictive model, in accordance with an embodiment of the present subject matter.

Referring now to FIG. 2, an embodiment of the system 102 for generating a predictive model is illustrated in accordance with the present subject matter. The system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any systems that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing systems, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of systems to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a receiving module 212, an extraction module 214, an identification module 216, a generation module 220, and other modules 224. The other modules 224 may include programs or coded instructions that supplement applications and functions of the system 102.

The data 210, amongst other things, serve as a repository for storing data processed, received, and generated by one or more of the modules 208. The data 210 may also include a system data 226, and other data 228. In one embodiment, the other data 228 may include data generated as a result of the execution of one or more modules in the other module 224.

In one implementation, a user may access the system 102 via the I/O interface 204. The user may be registered using the I/O interface 204 in order to use the system 102. In one aspect, the user may access the I/O interface 204 of the system 102 for obtaining information, providing inputs, configuring or implementing the system 102.

In the embodiment, the receiving module 212 may receive data. Further, the data comprises a plurality of features. In one example, the plurality of features may be understood as columns in the data. Further, the receiving module 212 may store the data in system data 226.

Further, in the embodiment, the extraction module 214 may extract one or more predicator features from the data based on a feature selection methodology. In one example feature selection methodology may comprises Statistical Analysis, data cleaning and identification.

In the embodiment, the extraction module 214 may execute a statistical analysis. The statistical analysis comprises classifying the plurality of features in to one of a numeric features, a categorical features and a non-numeric features, computing descriptive statistics for the numeric features, computing a feature data distribution for the categorical features and the non-numeric features based on a frequency encoding methodology. The descriptive statistics comprises one or more of a minimum value, a maximum value, a mean value, a standard deviation and a standard distribution.

In the embodiment, the extraction module 214 may execute a data cleansing. The data cleansing comprises deleting a constant data from the plurality of features, computing a Pearson co-relation coefficient between of the plurality of feature, and eliminating one or more features from the plurality of features based on similar Pearson correlation coefficient value. Further, the data cleansing comprises detecting one of an anomaly and an outliers in the data based on a statistical distribution analysis methodology; and replacing one of the anomaly and the outliers by one of the descriptive statistics.

In the embodiment, the extraction module 214 may compute a degree connectedness for each of the plurality of features using a modified mutual information technique and a Pearson co-efficient, identifying the one or more predicator features on a comparison of degree of connectedness and a predefined threshold before extracting. The degree connectedness is indicative of a connection between or more features from the plurality of features.

Furthermore, in the embodiment, the identification module 216 may identify a data type associated with the data. In one example, the data type is one of a time-series data type, a non-time series data type, a numerical data type, a categorical data type, seasonal stationary data type, a stationary data type or trend stationary. Further, the stationary or the trend stationary data type is identified using a Augmented Dickey-Fuller test, the time series or the non-time series data type is identified using alternate hypothesis method, and the seasonal stationary data type is identified using a similarly Hurst Exponent Measure.

In the embodiment, the generation module 218 may generate a predictive model to be applied on the data based on the data type of the one or more predicator features. In one example the predictive model comprises a classification model, a time series model and a regression model type.

Now referring to one other embodiment of the present subject matter, system and method for generation of predictive model based on Automated Data Modelling may embody and coexist with Open Source Distributed Processing Technologies like Spark, Hadoop and Open Source Distributions which can be used for the Data Pre-Processing and Post Processing. Further, in other example, the system and method may generate a predictive model based on a combination of 3 different techniques Feature Selection Algorithm Selection Federated learning.

In the example, the system and method may extracts Predicator feature from the received data by performing Statistical analysis like chi-square test and Kolmogorov-Smirnov test, dependencies among features, conditional probability among different categories, kernel density estimations and probability distributions of data. In other example, the features are categorized into numeric, categorical and non-numeric data. If feature falls into numerical category then descriptive statistics of data like minimum, maximum values, mean, standard deviation and distribution of the feature are found. If feature falls into categorical/non-numeric data, feature data distribution is found by converting the data into numerical data using frequency encoding. In one example, the features are analysed to find if any non-numerical values in numerical. If the threshold of the Numerical values is applicable, the non-numerical values are with one of the Min/Max/Mode/Standard Deviation by calculating the values of Min, Max, Mode and standard deviation. This converted feature can then be used for the Model Design/Training and Test. Outcome of statistical analysis is a data column/feature without any non-numerical values.

In the embodiment, further data cleaning is executed as having inaccurate features in the data may lead to building inaccurate predictive/analytical model which may result in poor accuracy while prediction. Cleaner the data, better the performance of analytical model. The data cleaning comprises Fill missing values in each feature with min/max/mean values, Remove empty and constant data features, as the constant data features don't provide any information related to predicator feature, Group similar features based on Pearson correlation coefficient value which gives linear relation between features, Eliminate redundant data features from grouped data, Anomaly/Outliers detection and replacement. In one example, Pearson co-relation coefficient between each feature/column with every feature/column in the dataset and the features with similar coefficient value are grouped together. In another example, the features/columns with similar Pearson co-relation coefficient are redundant features/columns which don't contribute to any increase in model performance measures. In one more example, Anomalies are detected by statistical distribution analysis and are replaced with Min/Max/Mean/Standard Deviation values.

In the embodiment, further predicator features are extracted based on a feature selection methodology. In one example, feature selection methodology comprises Applying the technique of Feature Connectedness using the Modified Mutual Information technique and Pearson Co-efficient to find how the feature is connected with other features. In one example, Mutual information gives the mutual dependency (non-linear relationship) between two features/columns of data, whereas Pearson Co-efficient gives only linear relationship between the features/columns of data. Considering both linear and nonlinear relationship between data features, enable reducing the number of features to be taken for model/algorithm building as more features for analytical model results in less accuracy and more time for processing. Further, identifying predicator features based on degree of connectedness such as high relative value of degree of connectedness value.

In the embodiment, further post extraction of the Predicator feature analysis on data is performed to find the data type. In one example, non-stationary time series data is converted to stationary by identifying and removing trends and removing stationary effects. Further, for converting initially "Augmented Dickey-Fuller test" is applied on pre-processed data. Augmented Dickey-Fuller test is an algorithm which accepts data column as input and identifies whether that data is stationary or trend stationary. Further, "Alternate Hypothesis" is used to verify if the time series data is stationary or is Trend Stationary. If the data is non-Stationary Time series data after applying stationary check, apply Hurst Exponent Measure on pre-processed data to find whether data belong to seasonal stationary time series. In case of Non-time series data, based on type of predicator feature non-time series data can be categorized as classification or regression data. If the predicator feature has continuous data, then we identify the model to be applied as regression model and if the data is categorical or discrete we identify the model to be applied as classification model.

In the embodiment, once the predicated features along with data type are identified, the next step would be generating a predictive model. In one example, Distributive auto-modelling framework fits each predictive model to the data from the set of predictive models available based on the type of model identified. In one example, every algorithm/model has a set of tuning parameters whose values can be changed to improve performance and accuracy of algorithm/ model. For example, a classification algorithm logistic regression has tuning parameters like "class weight, fit_intercept, and max_iterations" as tuning/algorithm parameters. Once the search space for each algorithm is defined, the model is executed using each parameter tuple from the search space. In order to optimize the searching algorithm, optimization algorithms are used to improve the performance and execution time. Once a desired fitness value (model error metrics) is reached, the optimization algorithms are stopped and the elite model parameters are used. In one example, the algorithm which optimizes/reduces number of iterations the model/algorithm to be executed to get the best tuning parameters may be understood as optimization algorithms. Genetic algorithm is used as the optimization algorithm.

In one embodiment, the system and method may be implemented on a Federated Learning system. Federated Learning is a decentralized learning process where the analytical model/algorithm is applied on data, which is secured and not available for access. A federated server is created and the model is sent to the secured data devices/servers and the model is generated on the secured data without pulling the data to the system to enhance the security measures to system for generating predictive model.

In one embodiment, the system and method is achieving speed and scalability with respect to big data and ML models by adopting mappers and reducers model in combination with message passing interface (MPI). The system and method is a scalable distributed implementations owing to its sophisticated DAG execution engine and in-memory caching for iterative computations. In the learning process, techniques like Map—Reduce approach and heuristic of selecting larger centroid points, distribution based Tree processing using hybrid steps, gain computation and processing, SGD based processing for the Neural networks and the Regression techniques, Expectation Maximization iterative batch processing are used.

Exemplary embodiments for generating a predictive model discussed above may provide certain advantages. Though not required to practice aspects of the disclosure, these advantages, without limitation, are the following.

Some embodiments of the system and the method enable Build once and deploy anywhere distributed engine.

Some embodiments of the system and the method enable Zero coding analytics framework.

Some embodiments of the system and the method enable Zero downtime deployment of models.

Some embodiments of the system and the method enable Custom based Distributed Pre-processing Training and Test components.

Some embodiments of the system and the method enable Federated learning across distributed nodes and master central node.

Some embodiments of the system and the method eliminate need of a User need not to have the prior knowledge of the data like Features or type of Data or type of problem it can be used to solve.

Some embodiments of the system and the method run on a distributed mode and hence it is efficient on the processing time on any sizes of data.

Figure 3:
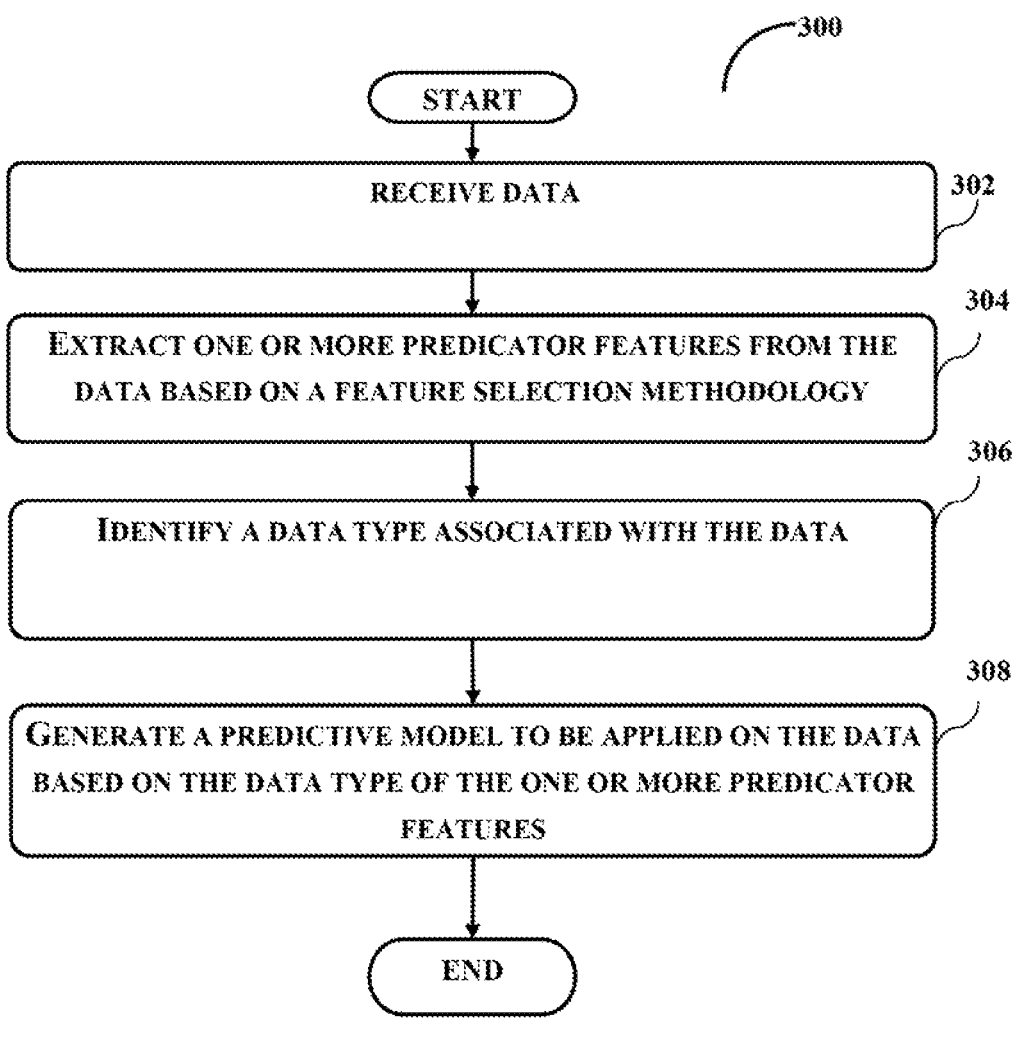
FIG. 3 illustrates a method for generating a predictive model, in accordance with an embodiment of the present subject matter.

Referring now to FIG. 3, a method 300 for generating a predictive model using a system 102, is disclosed in accordance with an embodiment of the present subject matter. The method 300 for generating a predictive model using a system 102 may be described in the general context of device executable instructions. Generally, device executable instructions can include routines, programs, objects, components, data structures, procedures, modules, functions, and the like, that perform particular functions or implement particular abstract data types. The method 300 for generating a predictive model using a system 102 may also be practiced in a distributed computing environment where functions are performed by remote processing systems that are linked through a communications network. In a distributed computing environment, computer executable instructions may be located in both local and remote computer storage media, including memory storage systems.

The order in which the method 300 for generating a predictive model using a system 102 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 for generating a predictive model using a system 102 may be considered to be implemented in the above-described system 102.

At block 302, data is received. The data may comprise a plurality of features indicative of columns in the data. In one embodiment, the receiving module 212 may receive data and store the data in the system data 226.

At block 304 one or more predicator features may extracted from the data based on a feature selection methodology. The feature selection methodology comprises computing, by the processor, a degree connectedness for each of the plurality of features using a modified mutual information technique and a Pearson co-efficient, and identifying, by the processor, the one or more predicator features on a comparison of degree of connectedness and a predefined threshold. The degree connectedness may be indicative of a connection between or more features from the plurality of features. In one embodiment, the extraction module 214 may extract one or more predicator features from the data, and store the one or more predicator features in the system data 226.

At block 306, a data type associated with the data is identified. In one example, the data type may be one of a time-series data type, a non-time series data type, a numerical data type, a categorical data type, seasonal stationary data type, a stationary data type or trend stationary. Further, the stationary or the trend stationary data type is identified using a Augmented Dickey-Fuller test, the time series or the non-time series data type is identified using alternate hypothesis method, and the seasonal stationary data type is identified using a similarly Hurst Exponent Measure. In one embodiment, the identification module 216 may identify a data type associated with the data and store the data type in system data 226.

At block 308, a best predictive model from pool of available predictive models may be generated to be applied on the data based on the data type of the one or more predicator features and the one or more predicator features. The predictive model comprises a classification model, a time series model and a regression model type. In one embodiment, the generation module 216 may generate a predictive model and may store the predictive model in the system data 226.

Although implementations for methods and systems for generating a predictive model have been described in language specific to features, system and/or methods, it is to be understood that the appended claims are not necessarily limited to the specific features or methods for generating a predictive model described. Rather, the specific features and methods are disclosed as examples of implementations for generating a predictive model.

What is claimed is:

1. A method for generating a predictive model, wherein the method comprising:

receiving, by a processor, data, wherein the data comprises a plurality of features, wherein the plurality of features is indicative of columns in the data;

extracting, by the processor, one or more predicator features from the data based on a feature selection methodology, wherein the feature selection methodology comprises:

computing, by the processor, a degree connectedness for each of the plurality of features using a modified mutual information technique and a Pearson correlation co-efficient value, wherein the degree connectedness is indicative of a connection between two or more features from the plurality of features, wherein the modified mutual information technique computes a non-linear relationship between at least two features from the plurality of features for the computation of the degree connectedness, and wherein the Pearson correlation co-efficient is used to compute a linear relationship between the at least two features from the plurality of features for the degree connectedness;

identifying, by the processor, the one or more predicator features on a comparison of degree of connectedness and a predefined threshold; and executing, by the processor, a data cleansing, wherein the data cleansing comprises:

deleting, by the processor, constant data from the plurality of features, wherein the constant data from the plurality of features do not provide information related to the one or more predicator features;

computing, by the processor, a Pearson correlation coefficient value between each of the plurality of feature;

eliminating, by the processor, one or more features from the plurality of features based on similar Pearson correlation coefficient value;

detecting, by the processor, one of an anomaly and an outliers in the data based on a statistical distribution analysis methodology; and replacing, by the processor, one of the anomaly and the outliers by one of the descriptive statistics;

identifying, by the processor, a data type associated with the data and the one or more predicator features, wherein the data type comprises a time-series data type, a non-time series data type, a numerical data type, a categorical data type, seasonal stationary data type, a stationary data type or trend stationary, wherein the stationary or the trend stationary data type is identified using a Augmented Dickey-Fuller test, wherein the time series or the non-time series data type is identified using alternate hypothesis method, and wherein the seasonal stationary data type is identified using a Hurst Exponent Measure;

computing, by the processor, a feature data distribution for the categorical features and the non-numeric features based on a frequency encoding methodology;

generating, by the processor, a predictive model applied on the data based on the data type and the one or more predicator features, wherein predictive model comprises a classification model, a time series model and a regression model type;

modifying tuning parameters of the predictive model;

optimizing the modified predictive model using a genetic algorithm; and applying a mappers and reducers model in combination with a message passing interface (MPI) on the predictive model and the data for iterative computations, wherein the mappers and reducers model is configured to execute feature analysis and model generation in a distributed framework, and wherein the MPI is configured to coordinate iterative execution and data exchange across distributed nodes within the distributed framework, thereby achieving speed and scalability for a scalable distributed implementation on the distributed framework.

2. The method of claim 1, wherein the feature selection methodology further comprises:

executing, by the processor, a statistical analysis, wherein the statistical analysis comprises:

classifying, by the processor, the plurality of features into one of a numeric features, a categorical features and a non-numeric features;

computing, by the processor, descriptive statistics for the numeric features, wherein the descriptive statistics comprises one or more of a minimum value, a maximum value, a mean value, a standard deviation and a standard distribution.

3. The method of claim 1, wherein generating a predictive model is based on federated learning methodology on the distributed framework.

4. A system for generating a predictive model, wherein the system comprising:

a memory; and a processor coupled to the memory, wherein the processor is configured to execute program instructions stored in the memory for:

receiving data, wherein the data comprises a plurality of features, wherein the plurality of features is indicative of columns in the data;

extracting one or more predicator features from the data based on a feature selection methodology, wherein the feature selection methodology comprises:

computing a degree connectedness for each of the plurality of features using a modified mutual information technique and a Pearson correlation co-efficient value, wherein the degree connectedness is indicative of a connection between or more features from the plurality of features, wherein the modified mutual information technique computes a non-linear relationship between at least two features from the plurality of features for the computation of the degree connectedness, and wherein the Pearson correlation co-efficient is used to compute a linear relationship between the at least two features from the plurality of features for the degree connectedness;

identifying the one or more predicator features on a comparison of degree of connectedness and a predefined threshold; and executing a data cleansing, wherein the data cleansing comprises:

deleting constant data from the plurality of features, wherein the constant data from the plurality of features do not provide information related to the one or more predicator features;

computing a Pearson correlation coefficient value between each of the plurality of feature;

eliminating one or more features from the plurality of features based on similar Pearson correlation coefficient value;

detecting one of an anomaly and an outliers in the data based on a statistical distribution analysis methodology; and replacing one of the anomaly and the outliers by one of the descriptive statistics;

identifying a data type associated with the data and the one or more predicator features, wherein the data type comprises a time-series data type, a non-time series data type, a numerical data type, a categorical data type, seasonal stationary data type, a stationary data type or trend stationary, wherein the stationary or the trend stationary data type is identified using a Augmented Dickey-Fuller test, wherein the time series or the non-time series data type is identified using alternate hypothesis method, and wherein the seasonal stationary data type is identified using a Hurst Exponent Measure;

computing a feature data distribution for the categorical features and the non-numeric features based on a frequency encoding methodology;

generating a predictive model to be applied on the data based on the data type of the one or more predicator features and the one or more predicator features, wherein predictive model comprises a classification model, a time series model and a regression model type;

modifying tuning parameters of the predictive model;

optimizing the modified predictive model using a genetic algorithm; and applying a mappers and reducers model in combination with a message passing interface (MPI) on the predictive model and the data for iterative computations, wherein the mappers and reducers model is configured to execute feature analysis and model generation in a distributed framework, and wherein the MPI is configured to coordinate iterative execution and data exchange across distributed nodes within the distributed framework, thereby achieving speed and scalability for a scalable distributed implementation on the distributed framework.

5. The system of claim 4, wherein the feature selection methodology comprises:

executing a statistical analysis, wherein the statistical analysis comprises:

classifying the plurality of features into one of a numeric feature, a categorical features and a non-numeric features;

computing descriptive statistics for the numeric features, wherein the descriptive statistics comprises one or more of a minimum value, a maximum value, a mean value, a standard deviation and a standard distribution.

6. The system of claim 4, wherein generating a predictive model is based on federated learning methodology on the distributed framework.

* * * * *